(12) United States Patent
Ucciardello et al.

(10) Patent No.: US 8,405,450 B2
(45) Date of Patent: Mar. 26, 2013

(54) LATCH CHARGE PUMP WITH EQUALIZATION CIRCUIT

(75) Inventors: Carmelo Ucciardello, Catania (IT);
Antonino Conte, Tremestieri Etneo (IT);
Santi Nunzio Antonino Pagano, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 176 days.

(21) Appl. No.: 12/882,981

(22) Filed: Sep. 15, 2010

(65) Prior Publication Data

US 2011/0068857 A1 Mar. 24, 2011

(30) Foreign Application Priority Data

Sep. 18, 2009 (IT) .............................. TO2009A0710

(51) Int. Cl.
*G05F 1/10* (2006.01)
*G05F 3/02* (2006.01)
(52) U.S. Cl. ...................................................... 327/536
(58) Field of Classification Search .................. 327/536; 363/59–60

See application file for complete search history.

(56) References Cited

U.S. PATENT DOCUMENTS

| | | | | | |
|---|---|---|---|---|---|
| 5,530,640 | A | * | 6/1996 | Hara et al. | 363/60 |
| 5,936,459 | A | * | 8/1999 | Hamamoto | 327/536 |
| 6,097,161 | A | * | 8/2000 | Takano et al. | 315/291 |
| 6,154,096 | A | | 11/2000 | Chien | |
| 6,430,087 | B1 | * | 8/2002 | Bill et al. | 365/185.23 |
| 6,469,571 | B2 | * | 10/2002 | Esterl et al. | 327/536 |
| 6,525,949 | B1 | * | 2/2003 | Johnson et al. | 363/60 |
| 6,717,459 | B2 | * | 4/2004 | Blodgett | 327/536 |
| 7,449,944 | B2 | * | 11/2008 | Byeon et al. | 327/589 |
| 7,847,618 | B2 | * | 12/2010 | Gebara et al. | 327/536 |
| 2006/0244516 | A1 | | 11/2006 | Lee et al. | |
| 2008/0278222 | A1 | | 11/2008 | Conte et al. | |

FOREIGN PATENT DOCUMENTS

EP 1881589 A1 1/2008

\* cited by examiner

*Primary Examiner* — Quan Tra
(74) *Attorney, Agent, or Firm* — Seed IP Law Group PLLC (57) ABSTRACT

A charge pump including first and a second charge-pump stages electrically coupled, four pump capacitors connected between two enable terminals and four internal nodes, two pump transistors connected to the pump capacitors and to the internal nodes, and having respective control terminals, two biasing capacitors, connected between the control terminals and the enable terminals, and an equalization circuit connected between the control terminals and structured to limit the voltage between the control terminals within a first range of values.

18 Claims, 10 Drawing Sheets

LATCH CHARGE PUMP WITH EQUALIZATION CIRCUIT

BACKGROUND

1. Technical Field

The present disclosure pertains to a circuit that includes a latch charge pump with equalization circuit and, more particularly to a charge pump having an equalization circuit to prevent malfunction during turning on and turning off of the charge pump.

2. Description of the Related Art

As is known, a charge pump is an electric circuit that performs the function of DC/DC converter and that avails itself of at least one capacitor, which is generally known as a "flying capacitor" and functions as an energy-storage element.

Operatively, the charge pump is such that, when it is supplied with a supply voltage $V_{dd}$, and it is connected to a load, it can supply to the load an output current $I_L$ and an output voltage $V_{out}$ in which it is possible for the latter to be higher than the supply voltage $V_{dd}$.

Amongst charge pumps available on the market today, the so-called "latch charge pumps" are present.

Figure 1:
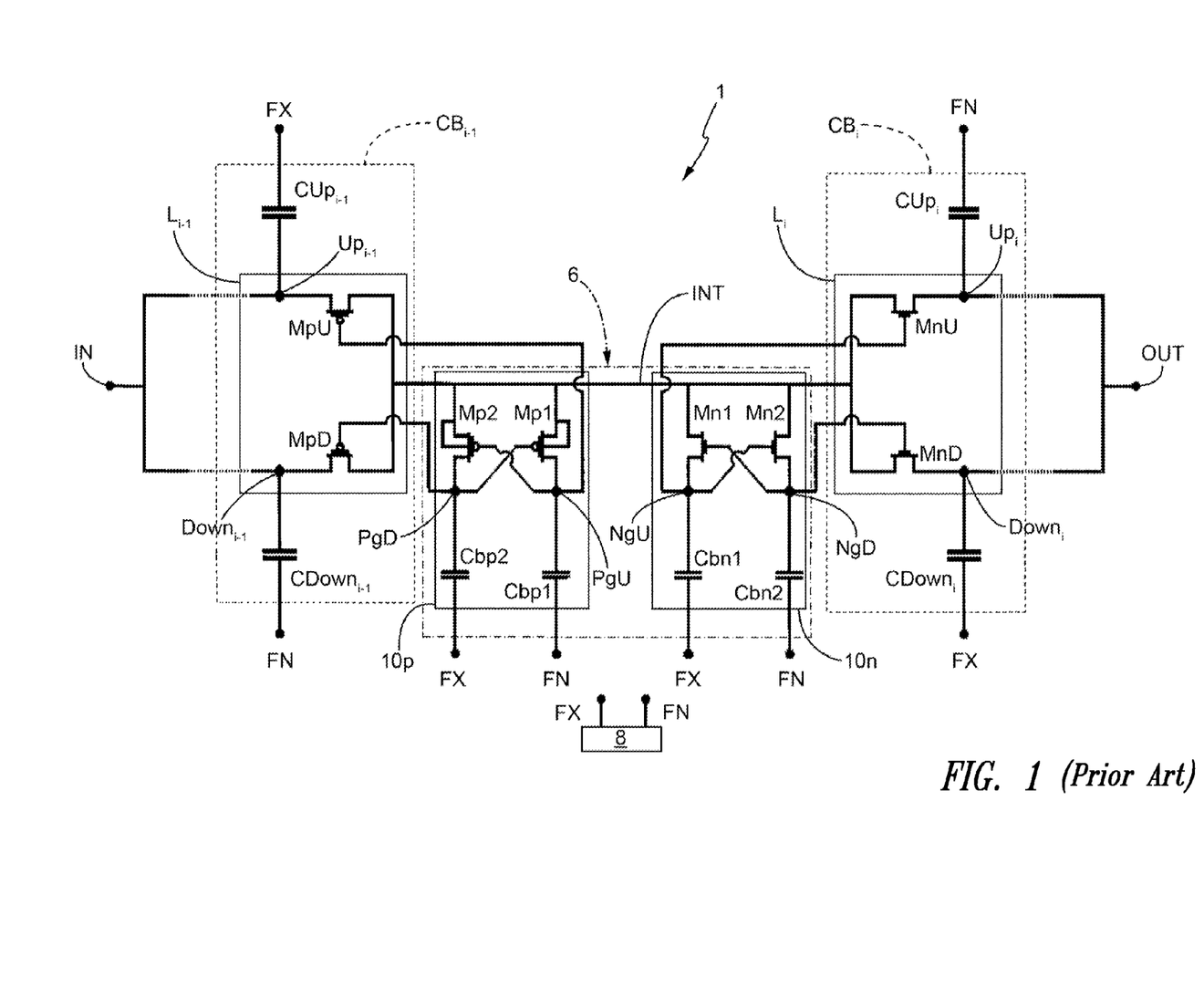
FIG. 1 shows a circuit diagram of a portion of a charge pump of a known type.

In particular, patent application No. EP1881589, filed on Jul. 19, 2006, in the name of the present applicant, describes a latch charge pump, which is illustrated in FIG. 1, where it is designated as a whole by 1.

In greater detail, the latch charge pump 1, which in what follows is referred to briefly as "charge pump 1", includes an input terminal IN, an output terminal OUT, a first enable terminal, and a second enable terminal, which are designated, respectively, by FX and FN, and at least two charge-pump stages. The charge-pump stages are connected in cascaded fashion between the input terminal IN and the output terminal OUT, and are connected, each, to the first enable terminal FX and to the second enable terminal FN. By way of example, shown in FIG. 1 are a first charge-pump stage and a second charge-pump stage, which are designated respectively by $CB_{i-1}$ and $CB_i$. More precisely, shown in FIG. 1 are, for simplicity of illustration, portions of the first charge-pump stage $CB_{i-1}$ and of the second charge-pump stage $CB_i$ that are involved in operations of mutual charge sharing, these portions being described hereinafter.

In detail, the first charge-pump stage $CB_{i-1}$ includes a first pump capacitor $CUp_{i-1}$, connected between the first enable terminal FX and a first internal node $Up_{i-1}$, and a second pump capacitor $CDown_{i-1}$, connected between the second enable terminal FN and a second internal node $Down_{i-1}$. In addition, the first charge-pump stage $CB_{i-1}$ includes a first latch circuit $L_{i-1}$, which is connected between the first internal node $Up_{i-1}$ and the second internal node $Down_{i-1}$, and is moreover connected to an intermediate node INT.

In turn, the first latch circuit $L_{i-1}$ includes a first pump transistor MpU, which is connected between the intermediate node INT and the first internal node $Up_{i-1}$, and has a first control terminal PgU. As illustrated by way of example in FIG. 1, the first pump transistor MpU can be a P-channel MOS transistor, the gate terminal of which corresponds to the aforementioned first control terminal PgU. As regards, instead, the drain and source terminals of the first pump transistor MpU, as likewise of all the transistors of a MOS type that will be mentioned and described hereinafter, they are generically referred to as "conduction terminals", the distinction between drain terminal and source terminal being of no importance for the purposes of operation of the charge pump 1. In detail, one of the conduction terminals of the first pump transistor MpU is connected to the first internal node $Up_{i-1}$, whilst the other is connected to the intermediate node INT.

The first latch circuit $L_{i-1}$ further includes a second pump transistor MpD, which is of the same type as the first pump transistor MpU, connected between the intermediate node INT and the second internal node $Down_{i-1}$, and which has a second control terminal PgD. The second pump transistor MpD is hence a P-channel MOS transistor, the gate terminal of which corresponds to the aforementioned second control terminal PgD. In addition, one of the conduction terminals of the second pump transistor MpD is connected to the second internal node $Down_{i-1}$, whilst the other is connected to the intermediate node INT.

As regards the second charge-pump stage $CB_i$, it includes a third pump capacitor $CUp_i$, connected between the second enable terminal FN and a third internal node $Up_i$, and a fourth pump capacitor $CDown_i$, connected between the first enable terminal FX and a fourth internal node $Down_i$. Furthermore, the second charge-pump stage $CB_i$ includes a second latch circuit $L_i$, which is connected between the third internal node $Up_i$ and the fourth internal node $Down_i$, and is moreover connected to the intermediate node INT.

In turn, the second latch circuit $L_i$ includes a third pump transistor MnU, which is connected between the intermediate node INT and the third internal node $Up_i$, has a third control terminal NgU, and is of a type opposite to that of the first and second pump transistors MpU, MpD. The third transistor MnU is hence an N-channel MOS transistor, the gate terminal of which corresponds to the aforementioned third control terminal NgU. In addition, one of the conduction terminals of the third pump transistor MnU is connected to the third internal node $Up_i$, whilst the other is connected to the intermediate node INT.

The second latch circuit $L_i$ further includes a fourth pump transistor MnD, which is of the same type as the third pump transistor MnU, connected between the intermediate node INT and the fourth internal node $Down_i$, and which has a fourth control terminal NgD. The fourth pump transistor MnD is hence an N-channel MOS transistor, the gate terminal of which corresponds to the aforementioned fourth control terminal NgD. In addition, one of the conduction terminals of the fourth pump transistor MnD is connected to the fourth internal node $Down_i$, whilst the other is connected to the intermediate node INT.

Figure 2:
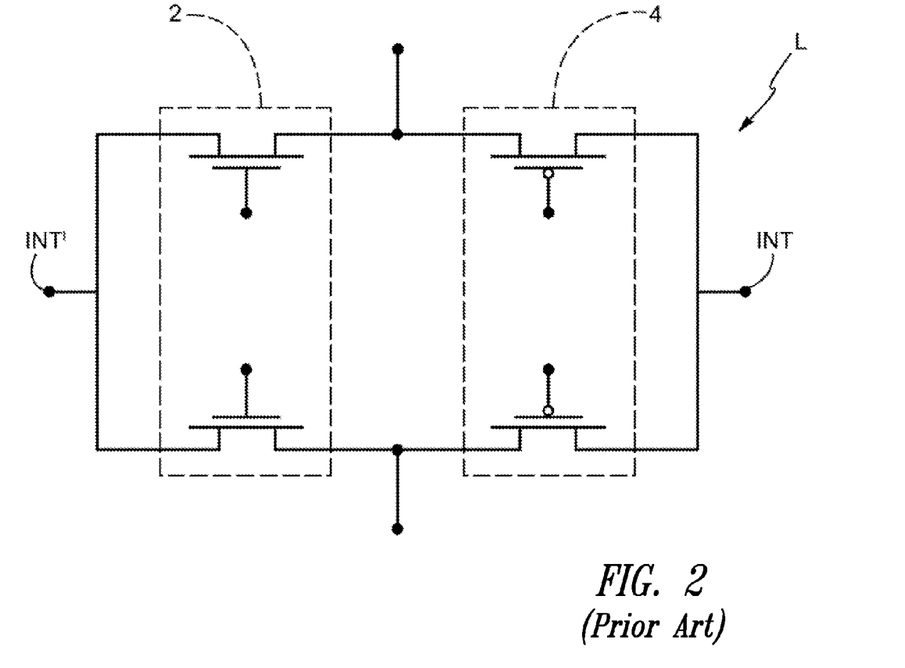
FIG. 2 shows a circuit diagram of an electronic circuit forming part of the charge pump represented in FIG. 1.

Note that, even though there have been described only the portions of the first and second charge-pump stages $CB_{i-1}$, $CB_i$ that, as described in greater detail hereinafter, are involved in operations of mutual charge sharing, and in particular there have been described only the portions of the first and second latch circuits $L_{i-1}$, $L_i$ involved in these operations of charge sharing, the first and second latch circuits $L_{i-1}$, $L_i$ are the same as one another. In other words, even though it is not shown in FIG. 1, the first latch circuit $L_{i-1}$ includes a fifth pump transistor and a sixth pump transistor, both of the same type as the third and fourth pump transistors MnU, MnD, whilst the second latch circuit $L_i$ further includes a seventh pump transistor and an eighth pump transistor, both of the same type as the first and second pump transistors MpU and MpD. By way of explanation, FIG. 2 shows a generic latch circuit L, formed by a first pair of transistors 2 and a second pair of transistors 4 connected in parallel. The first pair of transistors 2 is formed by two N-channel MOS transistors connected in series, whilst the second pair of transistors 4 is formed by two P-channel MOS transistors connected in series. FIG. 2 also illustrates the intermediate node INT and a further intermediate node INT', the latter designed to enable connection of the generic latch circuit L to a charge-pump stage, or else to the supply voltage $V_{dd}$.

Once again with reference to the charge pump 1, it further includes a stabilization stage 6, which in turn is formed by a number n of stabilization circuits. In greater detail, assuming that the charge pump 1 is formed by a number N of charge-pump stages, the charge pump 1 includes a number n of stabilization circuits equal to twice the number N of charge-pump stages. By way of example, FIG. 1 shows a first stabilization circuit and a second stabilization circuit, designated, respectively, by 10p and 10n.

In detail, the first stabilization circuit 10p includes in turn a first biasing capacitor Cbp1, connected between the first control terminal PgU and the second enable terminal FN, and a second biasing capacitor Cbp2, connected between the second control terminal PgD and the first enable terminal FX.

In addition, the first stabilization circuit 10p includes a first control transistor Mp1, connected between the first control terminal PgU and the intermediate node INT, and a second control transistor Mp2, connected between the second control terminal PgD and the intermediate node INT. In greater detail, the first and second control transistors Mp1, Mp2 are of the same type as the first and second pump transistors MpU, MpD.

As illustrated in FIG. 1, the first and second control transistors Mp1, Mp2 are P-channel MOS transistors. In addition, the gate terminal of the first control transistor Mp1 is connected to the second control terminal PgD, whilst one of the conduction terminals of the first control transistor Mp1 is connected to the intermediate node INT, and the other is connected to the first control terminal PgU. Furthermore, the gate terminal of the second control transistor Mp2 is connected to the first control terminal PgU, whilst one of the conduction terminals of the second control transistor Mp2 is connected to the intermediate node INT, and the other is connected to the second control terminal PgD. In addition, as illustrated once again in FIG. 1, the first and second control transistors Mp1, Mp2 can have respective bulk terminals, which can be connected to the intermediate node INT.

Likewise, the second stabilization circuit 10n includes a third biasing capacitor Cbn1, connected between the third control terminal NgU and the first enable terminal FX, and a fourth biasing capacitor Cbn2, connected between the fourth control terminal NgD and the second enable terminal FN.

The second stabilization circuit 10n further includes a third control transistor Mn1, connected between the third control terminal NgU and the intermediate node INT, and a fourth control transistor Mn2, connected between the fourth control terminal NgD and the intermediate node INT. In greater detail, the third and fourth control transistors Mn1, Mn2 are of the same type as the third and fourth pump transistors MnU, MnD.

As illustrated in FIG. 1, the third and fourth control transistors Mn1, Mn2 are N-channel MOS transistors. In addition, the gate terminal of the third control transistor Mn1 is connected to the fourth control terminal NgD, whilst one of the conduction terminals of the third control transistor Mn1 is connected to the intermediate node INT, and the other is connected to the third control terminal NgU. Furthermore, the gate terminal of the fourth control transistor Mn2 is connected to the third control terminal NgU, whilst one of the conduction terminals of the fourth control transistor Mn2 is connected to the intermediate node INT, and the other is connected to the fourth control terminal NgD.

In general, the first, second, third, and fourth pump capacitors $CUp_{i-1}$, $CDown_{i-1}$, $CUp_i$, and $CDown_i$ can have one and the same first nominal capacitance. Likewise, the first, second, third, and fourth biasing capacitors Cbp1, Cbp2, Cbn1 and Cbn2 can have one and the same second nominal capacitance. In addition, all the transistors present in the charge pump 1 can be of the low-voltage type.

In use, the charge pump 1 is supplied by connecting the input terminal IN to a first reference voltage, for example the supply voltage $V_{dd}$. In addition, the output terminal OUT is connected to a load (not shown), which is connected not only to the output terminal OUT, but also to a second reference voltage, for example ground. In greater detail, to cause the charge pump 1 to supply energy to the load itself, supplied to the charge pump 1, respectively through the first enable terminal FX and the second enable terminal FN, are a first enable signal sFX and a second enable signal sFN, which are both typically voltage signals and are generated, for example, by a provided generator 8 (FIG. 1), connected to the first enable terminal FX and to the second enable terminal FN.

Generally, the first and second enable signals sFX, sFN are periodic with one and the same period T, and moreover each of them assumes, alternatively, a maximum value Vmax or a minimum value Vmin such that the absolute value of the difference between the maximum value Vmax and the minimum value Vmin is higher than the threshold voltage of the transistors (both the pump transistors and the control transistors) of the charge pump 1, and lower than the breakdown voltage of the transistors (both the pump transistors and the control transistors) of the charge pump 1. In what follows, it is assumed, by way of example, that the maximum value Vmax and the minimum value Vmin are equal, respectively, to the supply voltage $V_{dd}$ and ground.

In greater detail, the first and second enable signals sFX, sFN are such as to be, ideally, in phase opposition. In other words, for each instant t, the first and second enable signals sFX, sFN assume different values. Again in other words, within a period T considered, it is possible to define a first subperiod and a second subperiod, which are consecutive to one another and are such that, during the first subperiod, the first and second enable signals sFX, sFN are, respectively, equal to $V_{dd}$ and 0 (or vice versa), whilst during the second subperiod they are, respectively, equal to 0 and $V_{dd}$ (or vice versa). The first and second subperiods can have the same duration.

Figure 3:
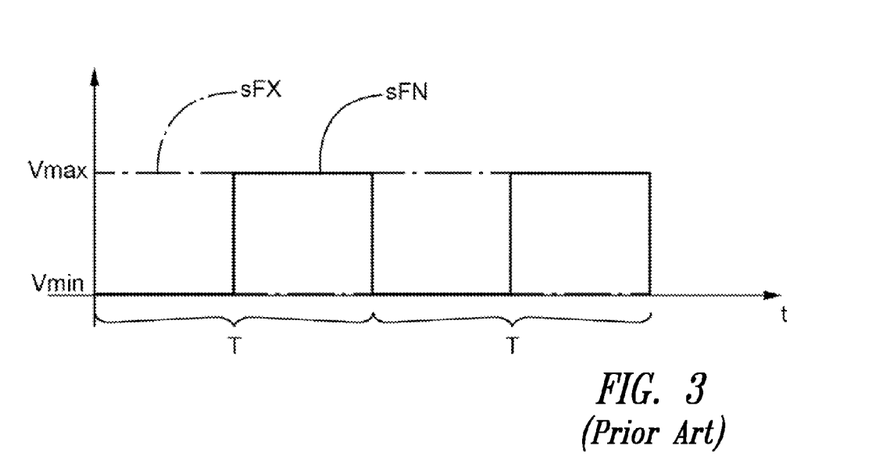
FIG. 3 shows the time plot of enable signals of a known type.

An example of the (ideal) time plot of the first and second enable signals sFX, sFN is illustrated in FIG. 3, which shows two consecutive periods of the first and second enable signals sFX, sFN.

At each instant t, the charge pump 1 is alternatively in a first operating condition or a second operating condition. In particular, having assumed that Vmax=$V_{dd}$ and Vmin=0, and recalling that the first and second enable signals sFX, sFN are in phase opposition, the first operating condition occurs when the value assumed by the first enable signal sFX is equal to 0, and the value assumed by the second enable signal sFN is equal to $V_{dd}$. Instead, if the values assumed, respectively, by the first and second enable signals sFX, sFN are equal to $V_{dd}$ and 0, the second operating condition arises. It follows that, within each period T, there occurs a change of operating condition between the first subperiod and the second subperiod.

In what follows, in order to describe the first and second operating conditions, it is assumed that the first, second, third, and fourth internal nodes $Up_{i-1}$, $Down_{i-1}$, $Up_i$, $Down_i$ have, respectively, a voltage $VcU_{i-1}$, a voltage $VcD_{i-1}$, a voltage $VcU_i$, and a voltage $VcD_i$, and that the first, second, third, and fourth control terminals PgU, PgD, NgU and NgD have, respectively, a voltage VPgU, a voltage VPgD, a voltage VngU, and a voltage VNgD. In addition, it is assumed that the intermediate node INT has a voltage $V_i$.

In detail, it may be shown that, in passing from the second operating condition to the first operating condition, the voltage VPgU passes from a value approximately equal to $V_i$-$V_{dd}$ to a value approximately equal to $V_i$, whilst the voltage VPgD passes from a value approximately equal to $V_i$ to a value approximately equal to $V_i$-$V_{dd}$. In addition, in passing from the second operating condition to the first operating condition, the voltage $VcU_{i-1}$ and the voltage $VcD_{i-1}$ undergo, respectively, a decrease and an increase, going to respective values such that, given the values accordingly assumed by the voltages VPgU and VPgD, the first pump transistor MpU is off, whilst the second pump transistor MpD is on.

Once again with reference to the passage from the second operating condition to the first operating condition, it may be shown that the voltage VNgD passes from a value approximately equal to $V_i$ to a value approximately equal to $V_i$+$V_{dd}$, whilst the voltage VNgU passes from a value approximately equal to $V_i$+$V_{dd}$ to a value approximately equal to $V_i$. In addition, in passing from the second operating condition to the first operating condition, the voltage $VcU_i$ and the voltage $VcD_i$ undergo, respectively, an increase and a decrease, going to respective values such that, given the values accordingly assumed by the voltages VNgU and VNgD, the third pump transistor MnU is off, whilst the fourth pump transistor MnD is on.

In practice, when the charge pump 1 is in the first operating condition, there occurs a charge sharing between the second pump capacitor $CDown_{i-1}$ and the fourth pump capacitor $CDown_i$; instead, between the first pump capacitor $CUp_{i-1}$ and the third pump capacitor $CUp_i$, charge sharing is prevented.

In a way similar to what has been described as regards the first operating condition, it may be shown that, when the charge pump 1 is in the second operating condition, the voltages VNgU, VNgD, VPgU, VPgD, $VcU_{i-1}$, $VcD_{i-1}$, $VcU_i$ and $VcD_i$ are such that the first pump transistor MpU and the third pump transistor MnU are on, whilst the second and fourth pump transistors MpD, MnD are off.

In detail, it may be shown that, in passing from the first operating condition to the second operating condition, the voltage VPgU passes from a value approximately equal to $V_i$ to a value approximately equal to $V_i$-$V_{dd}$, whilst the voltage VPgD passes from a value approximately equal to $V_i$-$V_{dd}$ to a value approximately equal to $V_i$. In addition, the voltage VNgD passes from a value approximately equal to $V_i$+$V_{dd}$ to a value approximately equal to $V_i$, whilst the voltage VNgU passes from a value approximately equal to $V_i$ to a value approximately equal to $V_i$+$V_{dd}$. Finally, in passing from the first operating condition to the second operating condition, the voltage $VcU_{i-1}$ and the voltage $VcD_{i-1}$ undergo, respectively, an increase and a decrease, whilst the voltage $VcU_i$ and the voltage $VcD_i$ undergo, respectively, a decrease and an increase.

In practice, when the charge pump 1 is in the second operating condition, there occurs a charge sharing between the first and third pump capacitors $CUp_{i-1}$, CUpi; instead, between the second and fourth pump capacitors $CDown_{i-1}$, $CDown_i$, charge sharing is prevented.

Figure 4:
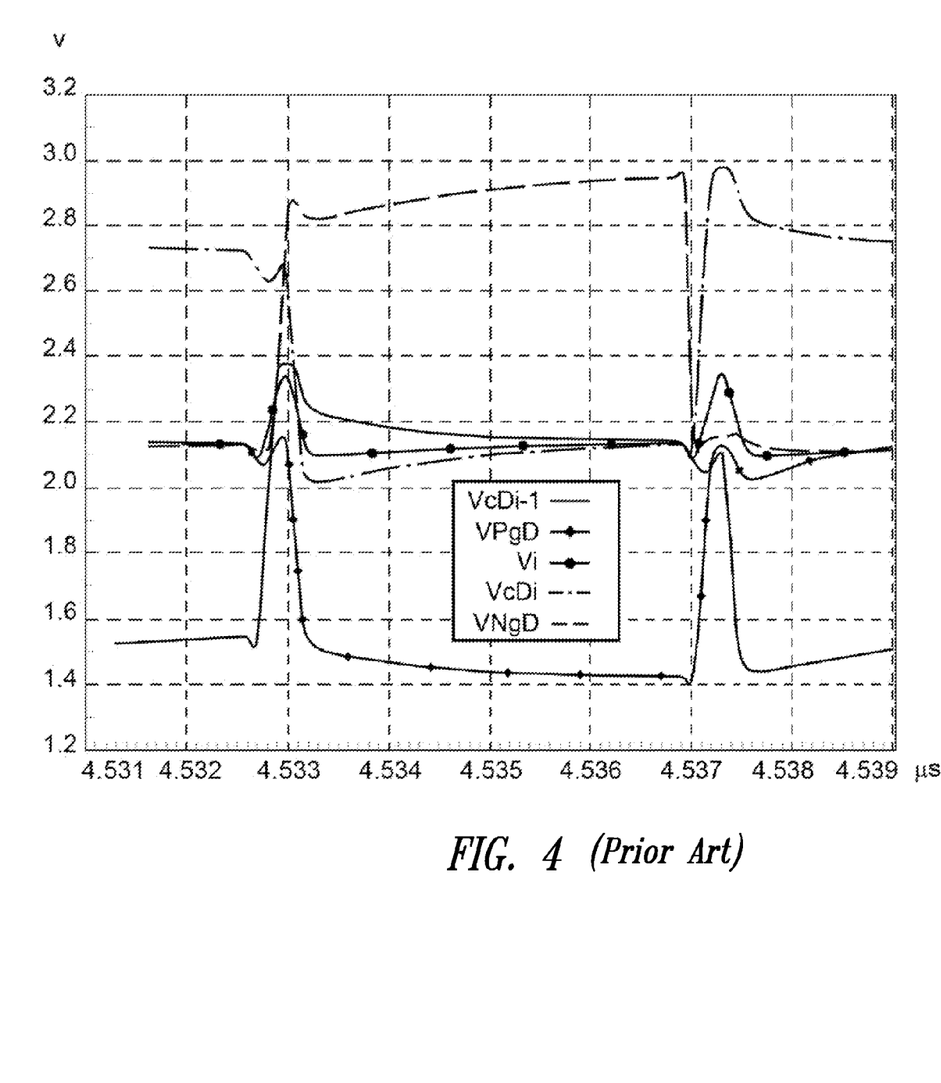
FIG. 4 shows time plots of voltages of nodes of the charge pump shown in FIG. 1.

By way of example, FIG. 4 illustrates the time plots of the voltages $VcD_{i-1}$, VPgD, $V_i$, $VcD_i$ and VNgD, where the changes thereof at the passage from the second operating condition to the first operating condition, and vice versa, are highlighted. In particular, it is assumed that the first and second enable signals sFX and sFN have a frequency of 120 MHz.

Operatively, the voltage $V_i$ of the intermediate node INT remains approximately constant, irrespective of the operating condition. In addition, within each subperiod, the potentials VPgU, VPgD, VNgU, VNgD remain to a first approximation constant. Consequently, within each subperiod, and hence throughout the duration of each charge sharing between the first and third pump capacitors $CUp_{i-1}$, $CUp_i$, or else between the second and fourth pump capacitors $CDown_{i-1}$, $CDown_i$, the states (on or off) of the first, second, third, and fourth pump transistors MpU, MpD, MnU, MnD do not change. In practice, the first, second, third and fourth control transistors Mp1, Mp2, Mn1, and Mn2 enable first, second, third, and fourth biasing capacitors Cbp1, Cbp2, Cbn1, Cbn2 to update respective charge states continuously, in addition to recovering any possible charge lost in driving the first, second, third, and fourth pump transistors MpU, MpD, MnU and MnD. It follows that charge sharing, and in general operation of the charge pump 1, is optimal, even in the case where the supply voltage $V_{dd}$ is not particularly high.

In particular, due to the possibility of using transistors of the low-voltage type, and due to the presence of just two operating conditions, the charge pump 1 can operate at frequencies higher than 100 MHz, and can moreover function with supply voltages $V_{dd}$ that are not necessarily high. For example, known to the art are charge pumps of the type described operating with supply voltages $V_{dd}$ close to 1 V.

Figure 5:
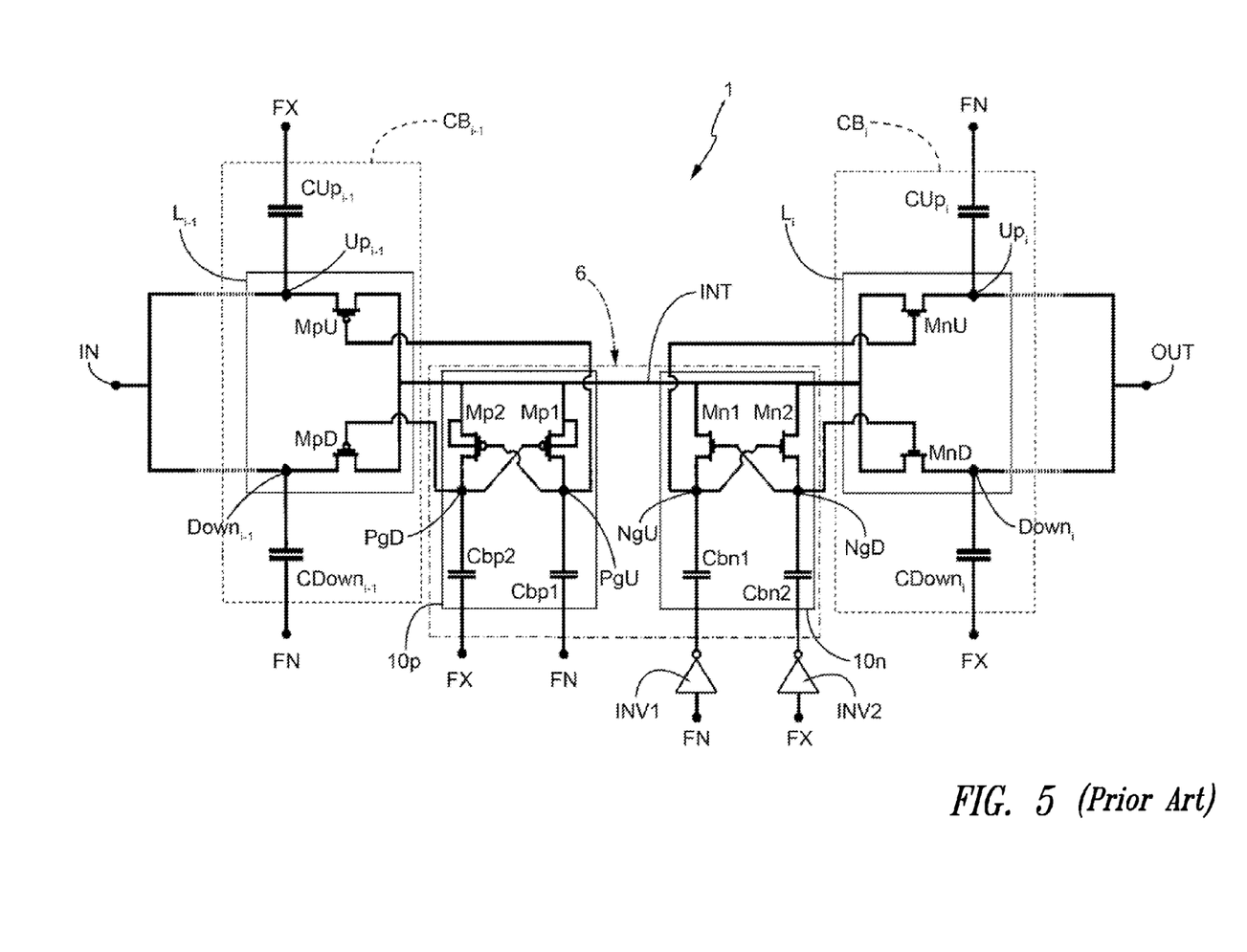
FIG. 5 shows a circuit diagram of a portion of a charge pump of a known type.

As shown in FIG. 5, the charge pump 1 can moreover include a first logic inverter and a second logic inverter, designated, respectively, by INV1 and INV2. In detail, the first logic inverter INV1 is connected between the third biasing capacitor Cbn1 and the second enable terminal FN so as to be set in series with the third biasing capacitor Cbn1 itself. Instead, the second logic inverter INV2 is connected between the fourth biasing capacitor Cbn2 and the first enable terminal FX so as to be set in series with the fourth biasing capacitor Cbn2 itself.

It may be shown that, due to the presence of the first and second logic inverters INV1, INV2, operation of the charge pump 1 remains optimal even in the case where the first and second enable signals sFX, sFN are not perfectly in phase opposition; i.e., they assume, in certain time intervals, one and the same value.

Figure 6:
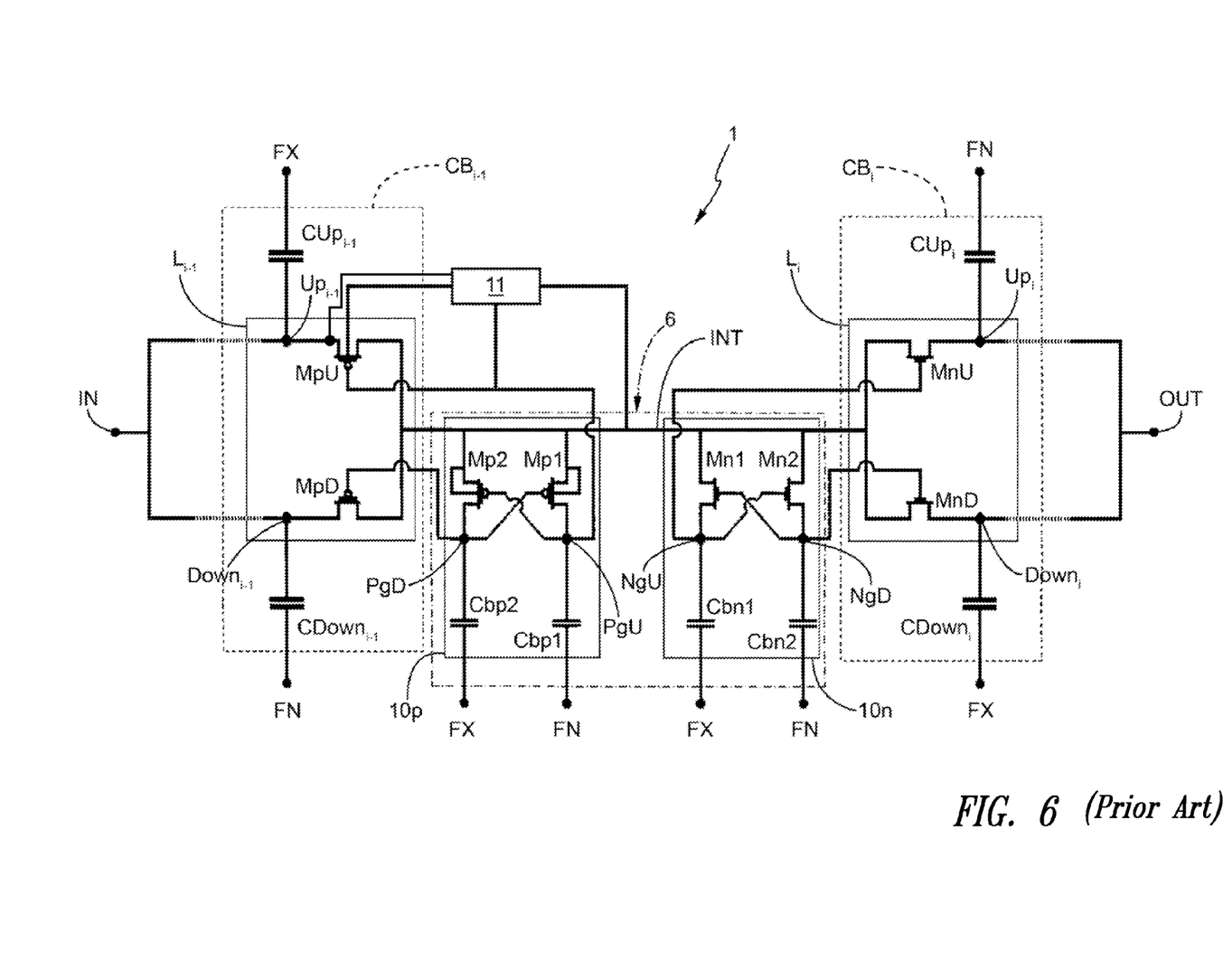
FIG. 6 shows a circuit diagram of a portion of a charge pump of a known type.

As shown in FIG. 6, the charge pump 1 can include a plurality of bulk-biasing circuits, only one of which is shown in FIG. 6, where it is designated by 11. In practice, there are present as many bulk-biasing circuits as the P-channel MOS transistors present in the latch circuits of the charge pump 1, the P-channel MOS transistors provided with respective bulk terminals. Described in what follows is just the bulk-biasing circuit 11 for the first pump transistor MpU.

In particular, the first pump transistor MpU is provided with a bulk terminal of its own, to which the bulk-biasing circuit 11 is connected. In addition, the bulk-biasing circuit 11 is connected to the first control terminal PgU and to the intermediate node INT.

Figure 7:
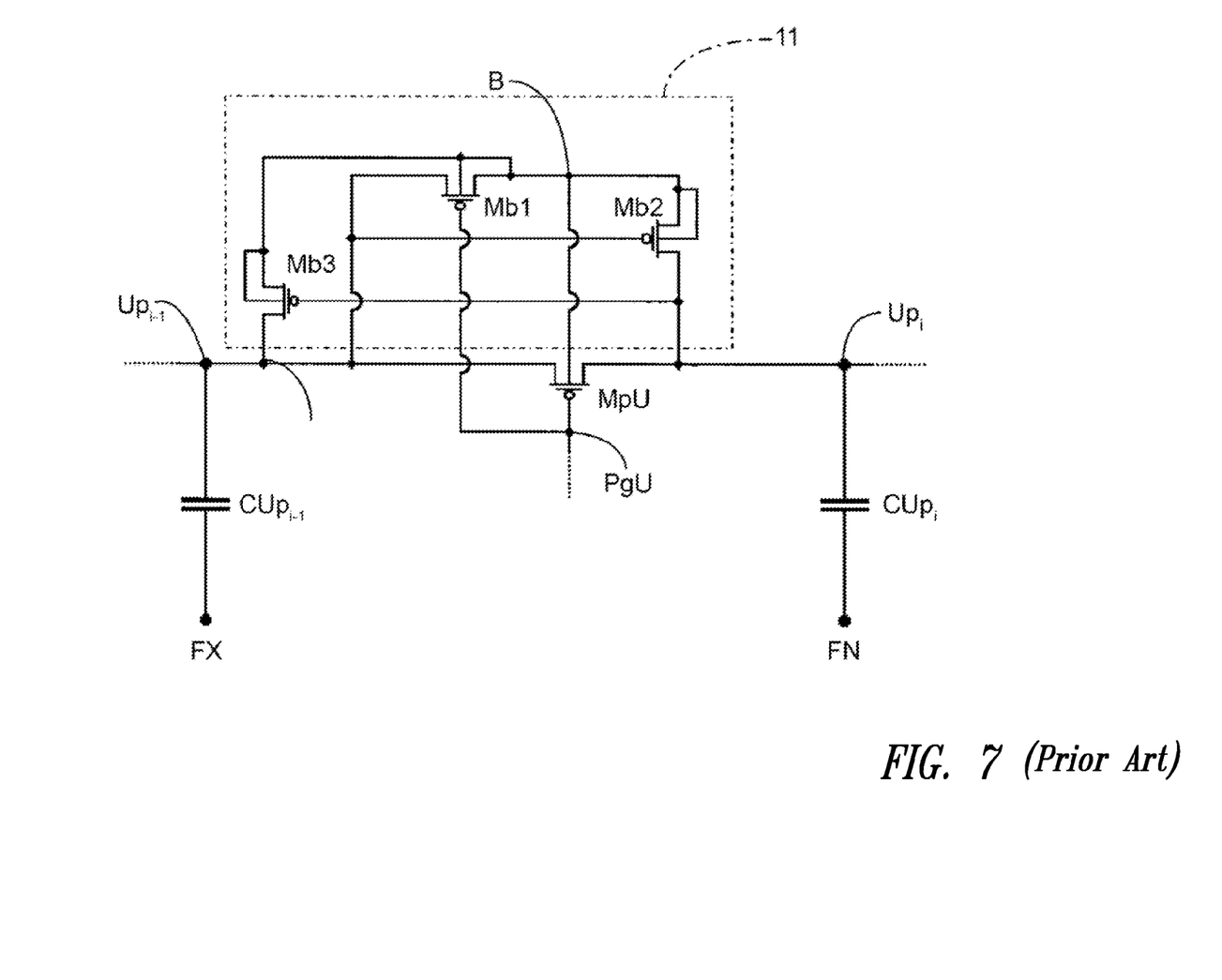
FIG. 7 shows a circuit diagram of an electronic circuit forming part of the charge pump represented in FIG. 6.

As shown in yet greater detail in FIG. 7, the bulk-biasing circuit 11 includes a first biasing transistor Mb1, a second biasing transistor Mb2, and a third biasing transistor Mb3, which are P-channel MOS transistors.

In detail, the first biasing transistor Mb1 has the gate terminal connected to the first control terminal PgU, and moreover has one of the respective conduction terminals connected to the first internal node $Up_{i-1}$, and the other conduction terminal connected to a bulk node B. The gate terminal of the second biasing transistor Mb2 is connected to the first internal node $Up_{i-1}$, whilst one of the conduction terminals of the second biasing transistor Mb2 is connected to the bulk node B, and the other is connected to the third internal node Upi. Furthermore, the gate terminal of the third biasing transistor Mb3 is connected to the third internal node $Up_i$, whilst one of the conduction terminals of the third biasing transistor Mb3 is connected to the bulk node B, and the other is connected to the first internal node $Up_{i-1}$.

The first, second, and third biasing transistors Mb1, Mb2, Mb3 possess respective bulk terminals, which are all connected to the bulk node B.

Operatively, the bulk-biasing circuits prevent onset of the so-called "latchup" phenomenon within the P-channel MOS transistors forming part of the latch circuits of the charge pump 1, the phenomenon being due to the presence of parasitic transistors within the P-channel MOS transistors themselves. In fact, the bulk-biasing circuits cause the bulk terminals of the P-channel MOS transistors to be kept at voltages such that the aforementioned parasitic transistors will be off.

The charge pump 1 represents a considerable improvement as compared to previously known charge pumps, which were able to operate at frequencies not higher than 50 MHz and required high supply voltages $V_{dd}$. However, there exist situations in which operation of the charge pump 1 may prove non-optimal.

For example, when the charge pump 1 is off, i.e., when the first and second enable terminals FX, FN are connected to ground, the first, second, third, and fourth biasing capacitors Cbp1, Cbp2, Cbn1 and Cbn2 are discharged towards ground. The discharge can occur in such a way that, at an instant $t_x$, three of the aforementioned biasing capacitors, for example the first, second, and third biasing capacitors Cbp1, Cbp2, Cbn1, are at one and the same first intermediate voltage Vx1, whilst a remaining biasing capacitor, for example the fourth biasing capacitor Cbn2, is at a second intermediate voltage $Vx2>Vx1+V_{dd}$.

Consequently, if at the instant $t_x$ the charge pump 1 is turned back on, for example to send the charge pump 1 to the second operating condition, hence bringing the first enable terminal FX to the supply voltage $V_{dd}$, the voltage VNgU does not exceed the voltage VNgD, in such a way that the fourth control transistor Mn2 remains off, thus not enabling discharge of the fourth biasing capacitor Cbn2. In fact, the voltage VNgD is such that the third control capacitor Mn1 remains on, with the consequence that the voltage VNgU remains equal to $V_i$.

It thus follows that, once the charge pump 1 is turned back on, the voltage VNgD remains stably (i.e., irrespective of the operating condition in which the charge pump 1 finds itself) higher than the voltages $VcD_i$ and $VcU_i$, and hence the fourth pump transistor MnD remains stably on, irrespective of the operating condition in which the charge pump 1 finds itself.

It follows that, after turning back on, when the charge pump 1 is in the second operating condition, in which there should in theory occur charge sharing between the first and third pump capacitors $CUp_{i-1}$, $CUp_i$, there occurs in actual fact a charge sharing between the first, third, and fourth pump capacitors $CUp_{i-1}$, $CUp_i$, $CDown_i$, with consequent decay of the level of performance of the charge pump 1, and in particular with consequent reduction of the output current $I_L$. In addition, the fact that the third control transistor Mn1 remains stably on leads to the third biasing capacitor Cbn1 discharging to the voltage $V_i$, and hence to the voltage VNgU not being sufficient to turn the third pump transistor MnU on. Consequently, the charge sharing between the first and third pump capacitors $CUp_{i-1}$, $CUp_i$ is limited also by the failure of the third pump transistor MnU to switch on, or in any case by imperfect switching-on thereof.

A further example of non-optimal operation of the charge pump 1 arises when the charge pump 1 is off, and discharge of the first, second, third, and fourth biasing capacitors Cbp1, Cbp2, Cbn1 and Cbn2 occurs in such a way that the second, third, and fourth biasing capacitors Cbp2, Cbn1, Cbn2 go to one and the same third intermediate voltage Vx3, whilst the first biasing capacitor Cbp1 goes to a fourth intermediate voltage $Vx4<Vx3-V_{dd}$.

In said conditions, if the charge pump 1 is turned back on, the voltage VPgU is such that the second control transistor Mp2 is always on, and hence the voltage VPgD is once again equal to $V_i$, so preventing turning-on of the first control transistor Mp1, even when the second enable terminal FN is set at $V_{dd}$. Consequently, the first biasing capacitor Cbp1 never discharges.

Hence, once the charge pump 1 is turned back on, the first pump transistor MpU remains stably on, irrespective of the operating condition in which the charge pump 1 finds itself. It follows that, after turning back on, when the charge pump 1 is in the first operating condition, in which there should in theory occur charge sharing between the second and fourth pump capacitors $CDown_{i-1}$, $CDown_i$, there occurs in actual fact a charge sharing between the first, second, and fourth pump capacitors $CUp_{i-1}$, $CDown_{i-1}$, $CDown_i$, with consequent decay of the level of performance of the charge pump 1. In addition, when the charge pump 1 finds itself in the first operating condition, it is found that the voltage VPgD is such as not to enable turning-on of the second pump transistor MpD, and hence the charge sharing between the second and fourth pump capacitors $CDown_{i-1}$, $CDown_i$ is limited also by the failure of the second pump transistor MpD to switch on, or in any case by imperfect switching-on thereof, thus further reducing the output current $I_L$ supplied to the load by the charge pump 1.

In general, it is moreover possible that, in the situations described previously, turning back on of the charge pump 1 causes breakdown of one or more oxide layers present within the first, second, third, and fourth pump transistors MpU, MpD, MnU, MnD.

BRIEF SUMMARY

The aim of the present disclosure is to provide a charge pump of a latch type that will enable the drawbacks of the known art to be overcome at least partially.

According to the disclosure, a charge pump of a latch type is provided that includes at least a first and a second charge-pump stage electrically coupled by means of an intermediate node, and further including a first pump capacitor, connected between a first enable terminal and a first internal node; a second pump capacitor, connected between a second enable terminal and a second internal node; a third pump capacitor, connected between the second enable terminal and a third internal node; a fourth pump capacitor, connected between the first enable terminal and a fourth internal node; a first pump transistor connected between the first internal node and the intermediate node, and having a first control terminal; a second pump transistor connected between the second internal node and the intermediate node, and having a second control terminal; a first biasing capacitor, connected between the first control terminal and the second enable terminal; a second biasing capacitor, connected between the second control terminal and the first enable terminal; and a first equalization circuit connected between the first and the second control terminal and structured to limit a first voltage between the first and the second control terminal within a first range of values.

In accordance with another aspect of the present disclosure, a circuit is provided that includes a charge pump having at least first and second charge pump stages coupled at an intermediate node, and having a first, second, third, and fourth pump transistors with first, second, third, and fourth control terminals respectively, the charge pump further comprising a first equalization circuit coupled between the first and second control terminals, and a second equalization circuit coupled between the third and fourth control terminals.

BRIEF DESCRIPTION OF THE SEVERAL VIEWS OF THE DRAWINGS

For a better understanding of the disclosure, embodiments thereof are now described, purely by way of non-limiting example and with reference to the attached drawings, wherein.

DETAILED DESCRIPTION

Figure 8:
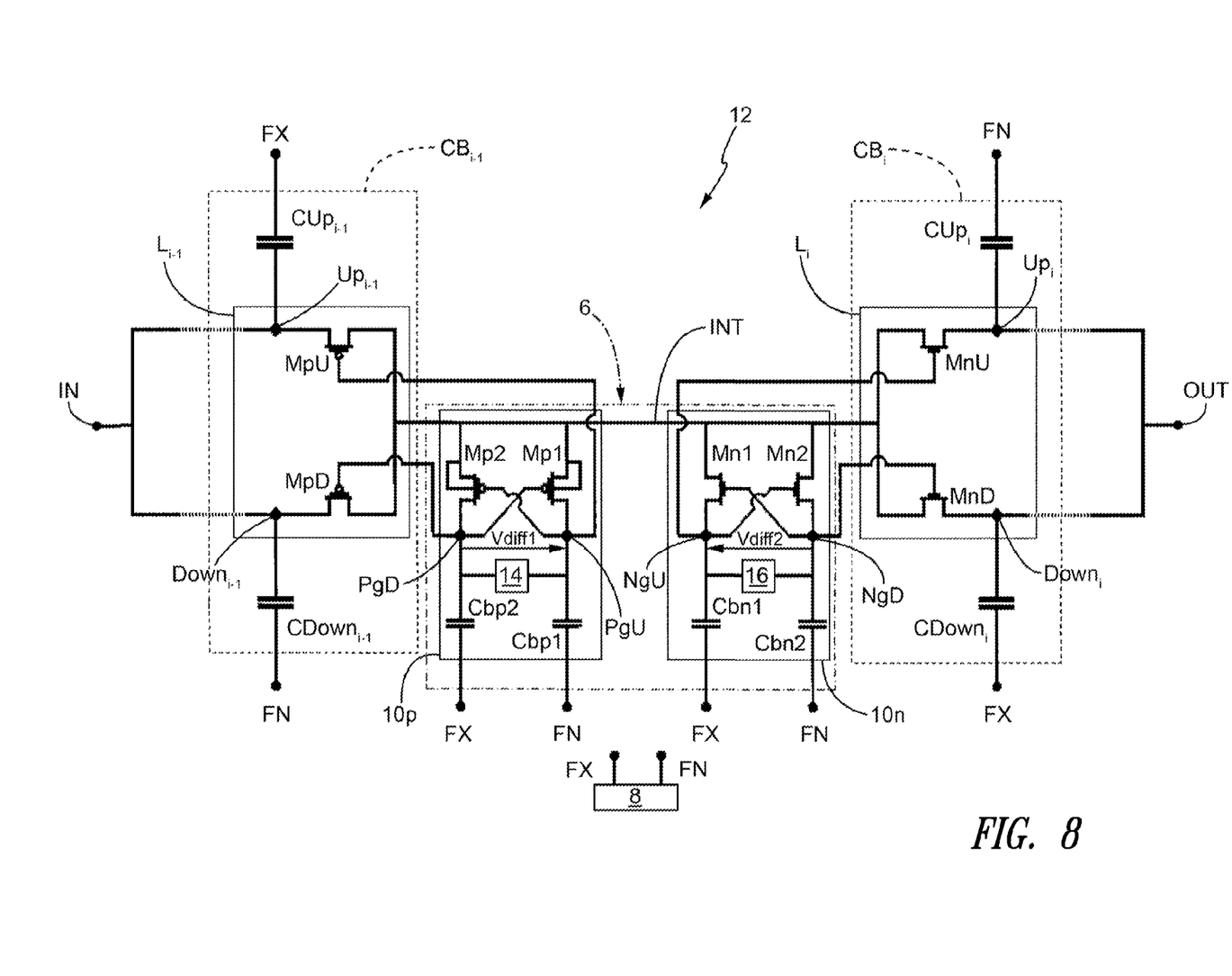
FIG. 8 shows a circuit diagram of a portion of an embodiment of a latch charge pump in accordance with the present disclosure.

FIG. 8 shows a first embodiment of a charge pump of a latch type formed in accordance with the present disclosure, designated as a whole by 12, which will be referred to as "charge pump 12" for brevity.

The charge pump 12, and more precisely different embodiments of the charge pump 12, are described hereinafter, the present description being limited just to the differences of the charge pump 12 with respect to the charge pump 1 previously described and shown in FIGS. 1, 5 and 6. In addition, components of the charge pump 12 already present in the charge pump 1 previously described are designated with the same reference numbers.

In particular, the charge pump 12 includes an equalization stage formed by a number S of equalization circuits, for example equal to twice the number of latch circuits included in the charge pump 12 itself. By way of example, FIG. 8 shows a first equalization circuit and a second equalization circuit, designated, respectively, by 14 and 16.

In particular, the first equalization circuit 14 is connected between the first control terminal PgU and the second control terminal PgD, whilst the second equalization circuit 16 is connected between the third control terminal NgU and the fourth control terminal NgD.

Operatively, the first and second equalization circuits 14, 16, respective embodiments of which are described in detail hereinafter, have the function of enabling control of the voltages VPgU, VPgD, VNgU and VNgD of the first, second, third, and fourth control terminals PgU, PgD, NgU, NgD, respectively, even when the charge pump 12 is off.

In greater detail, if we designate by Vdiff1 the voltage present between the first and second control terminals PgU, PgD, and by Vdiff2 the voltage present between the third control terminal NgU and the fourth control terminal NgD, the first and second equalization circuits 14, 16 perform the function of limiting in absolute value, respectively, the voltages Vdiff1 and Vdiff2.

In other words, the first and second equalization circuits 14, 16 have the function of equalizing, respectively, the voltages VPgU and VPgD of the first and second control terminals PgU, PgD, and the voltages VNgU and VNgD of the third and fourth control terminals NgU, NgD. In fact, as described previously, in the absence of the first and second equalization circuits 14, 16, and in the case where the first, second, third, and fourth biasing capacitors Cbp1, Cbp2, Cbn1, Cbn2 discharge with different discharge times, it is possible for the aforementioned voltages Vdiff1 and Vdiff2 to assume values such as to prevent proper operation of the charge pump 12.

Figure 9:
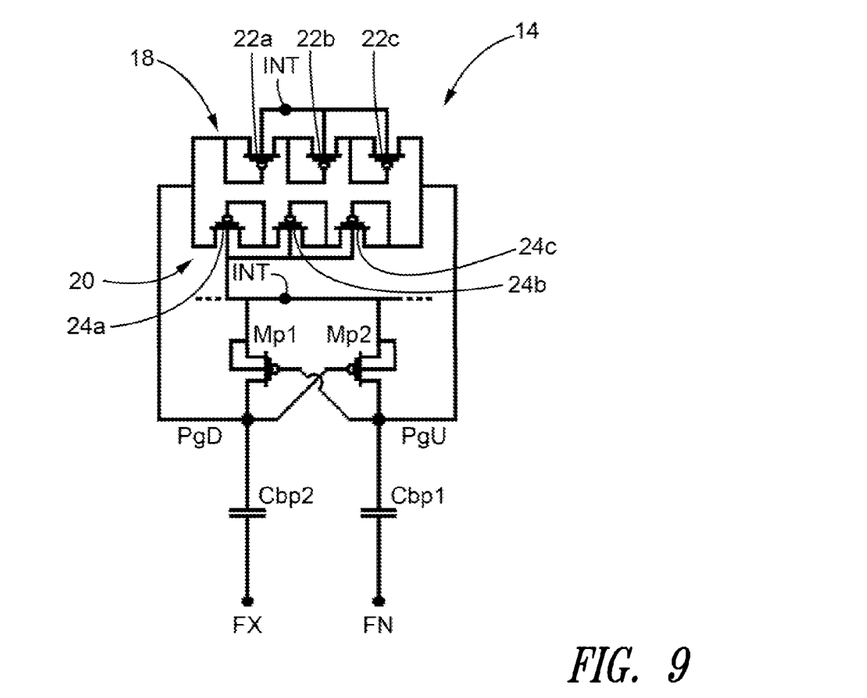
FIGS. 9 and 10 show equalization circuits and portions of the latch charge pump of FIG. 8.

FIG. 9 shows a possible embodiment of the first equalization circuit 14. In detail, the first equalization circuit 14 performs the function of a diode bridge, and is formed by a first series circuit and a second series circuit, which are set in parallel and designated respectively by 18 and 20.

In greater detail, the first and second series circuits 18, 20 each include a number $N_{t1}$ of bridge transistors, which are connected in series and can be of one and the same type, for example of the same type as the first and second pump transistors MpU, MpD. In addition, each of the bridge transistors of the first and second series circuits 18, is diode-connected.

By way of example, in the embodiment illustrated in FIG. 9, the number $N_{t1}$ is equal to three. In particular, the first series circuit 18 is formed by a first bridge transistor, a second bridge transistor, and a third bridge transistor, designated, respectively, by 22a, 22b, 22c. The first, second, and third bridge transistors 22a, 22b, 22c are P-channel MOS transistors.

In greater detail, the gate terminal and a first conduction terminal of the first bridge transistor 22a are connected to the second control terminal PgD, whilst the second conduction terminal of the first bridge transistor 22a is connected to the gate terminal and to a first conduction terminal of the second bridge transistor 22b. In addition, the second conduction terminal of the second bridge transistor 22b is connected to the gate terminal and to a first conduction terminal of the third bridge transistor 22c, the second conduction terminal of the third bridge transistor 22c being connected to the first control terminal PgU.

Once again with reference to the embodiment shown in FIG. 9, the second series circuit 20 is formed by a fourth bridge transistor, a fifth bridge transistor, and a sixth bridge transistor, which are P-channel MOS transistors and are designated, respectively, by 24a, 24b, 24c.

In greater detail, a first conduction terminal of the fourth bridge transistor 24a is connected to the second control terminal PgD, whilst the gate terminal and the second conduction terminal of the fourth bridge transistor 24a are connected to a first conduction terminal of the fifth bridge transistor 24b. The gate terminal and the second conduction terminal of the fifth bridge transistor 24b are connected to a first conduction terminal of the sixth bridge transistor 24c. In addition, the gate terminal and the second conduction terminal of the third bridge transistor 24c are connected to the first control terminal PgU.

As shown in FIG. 9, the first, second, third, fourth, fifth, and sixth bridge transistors 22a, 22b, 22c, 24a, 24b, 24c can have respective bulk terminals, which can be connected to the intermediate node INT.

Figure 10:
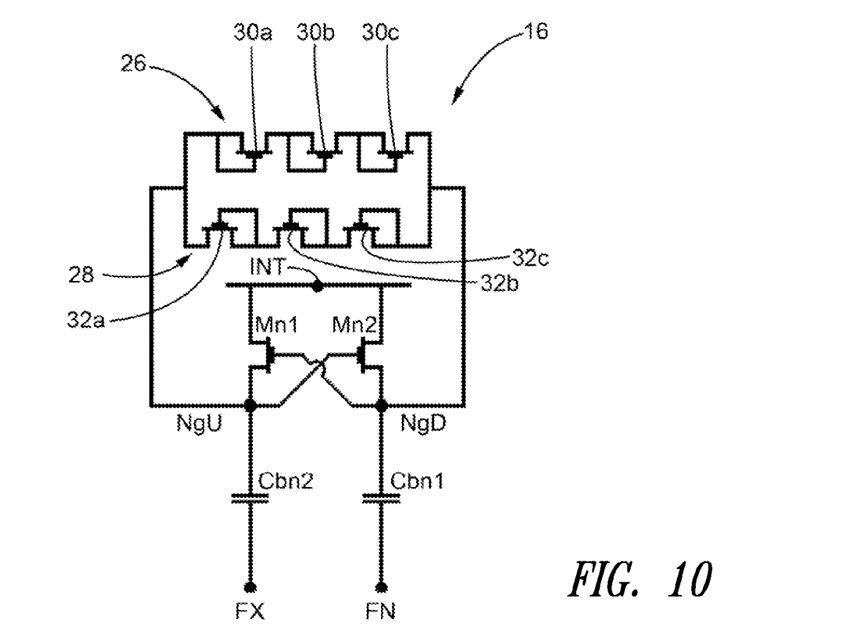

FIG. 10 shows a possible embodiment of the second equalization circuit 16. In detail, the second equalization circuit 16 performs the function of a diode bridge, and is formed by a third series circuit and a fourth series circuit, designated, respectively, by 26 and 28.

In particular, the third and fourth series circuits 26, 28 each include a number $N_{t2}$ of bridge transistors, which are connected in series and can be of one and the same type, for example of the same type as the third and fourth pump transistors MnU, MnD. In addition, each of the bridge transistors of the third and fourth series circuit 26, 28 is diode-connected.

By way of example, in the embodiment illustrated in FIG. 10, the number $N_{t2}$ is equal to three; hence $N_{t1}=N_{t2}$. In particular, the third series circuit 26 is formed by a seventh bridge transistor, an eighth bridge transistor, and a ninth bridge transistor, which are designated, respectively, by 30a, 30b, 30c. The seventh, eighth, and ninth bridge transistors 30a, 30b, 30c are N-channel MOS transistors.

In greater detail, the gate terminal and a first conduction terminal of the seventh bridge transistor 30a are connected to the third control terminal NgU, whilst the second conduction terminal of the seventh bridge transistor 30a is connected to the gate terminal and to a first conduction terminal of the eighth bridge transistor 30b. In addition, the second conduction terminal of the eighth bridge transistor 30b is connected to the gate terminal and to a first conduction terminal of the ninth bridge transistor 30c, the second conduction terminal of the ninth bridge transistor 30c being connected to the fourth control terminal NgD.

Once again with reference to the embodiment shown in FIG. 10, the fourth series circuit 28 is formed by a tenth bridge transistor, an eleventh bridge transistor, and a twelfth bridge transistor, which are N-channel MOS transistors and are designated, respectively, by 32a, 32b, 32c.

In greater detail, a first conduction terminal of the tenth bridge transistor 32a is connected to the third control terminal NgU, whilst the gate terminal and the second conduction terminal of the tenth bridge transistor 32a are connected to a first conduction terminal of the eleventh bridge transistor 32b. The gate terminal and the second conduction terminal of the eleventh bridge transistor 32b are connected to a first conduction terminal of the twelfth bridge transistor 32c. In addition, the gate terminal and the second conduction terminal of the twelfth bridge transistor 32c are connected to the fourth control terminal NgD.

Considering individually each transistor from among the first, second, third, fourth, fifth, sixth, seventh, eighth, ninth, tenth, eleventh, and twelfth bridge transistors 22a-22c, 24a-24c, 30a-30c, 32a-32c, the conduction terminal that is connected to the gate terminal can be considered as being equivalent to an anode of a corresponding diode, whilst the other conduction terminal can be considered as being equivalent to the cathode of this corresponding diode. It follows that the first and second series circuits 18, 20 are connected in antiparallel configuration; i.e., they are connected in such a way that, when the first, second, and third bridge transistors 22a-22c are traversed by one and the same current, the fourth, fifth, and sixth bridge transistors 24a-24c are inhibited, and vice versa. Likewise, also the third and fourth series circuits 26, 28 are connected in antiparallel configuration.

Operatively, assuming that the first and second control transistors Mp1, Mp2 have one and the same first threshold voltage $V_{th1}$ (understood as voltage between gate terminal and source terminal, and hence negative, in so far as they are P-channel MOS transistors), the presence of the first equalization circuit 14 leads to the relation $|Vdiff1|<N_{t1}*|V_{th1}|$ being valid.

In detail, the number $N_{t1}$ can be chosen in such a way that $V_{dd}-|V_{th1}|<N_{t1}*|V_{th1}|<V_{dd}$. In this way, the first equalization circuit 14 does not intervene during normal operation of the charge pump 12, unless there occurs one of the situations in which operation of the charge pump 12 can prove non-optimal, the situations having been described previously.

In greater detail, the relation $N_{t1}*|V_{th1}|<V_{dd}$ prevents the aforementioned non-optimal situations of operation, whilst the relation $V_{dd}-|V_{th1}|<N_{t1}*|V_{th1}|$ prevents, during normal operation of the charge pump 12, any exchange of charge from occurring between the first biasing capacitor Cbp1 and the second biasing capacitor Cbp2.

Likewise, assuming that the third and fourth control transistors Mn1, Mn2 have one and the same second threshold voltage $V_{th2}$ (understood as voltage between gate terminal and source terminal, and hence positive, in so far as they are N-channel MOS transistors), the presence of the second equalization circuit 16 leads to the relation $|Vdiff2|<N_{t2}*|V_{th2}|$ being valid. In a way similar to what has been described as regards the number $N_{t1}$, the number $N_{t2}$ can be chosen in such a way that $V_{dd}-V_{th2}<N_{t2}*V_{th2}<V_{dd}$.

Figure 11:
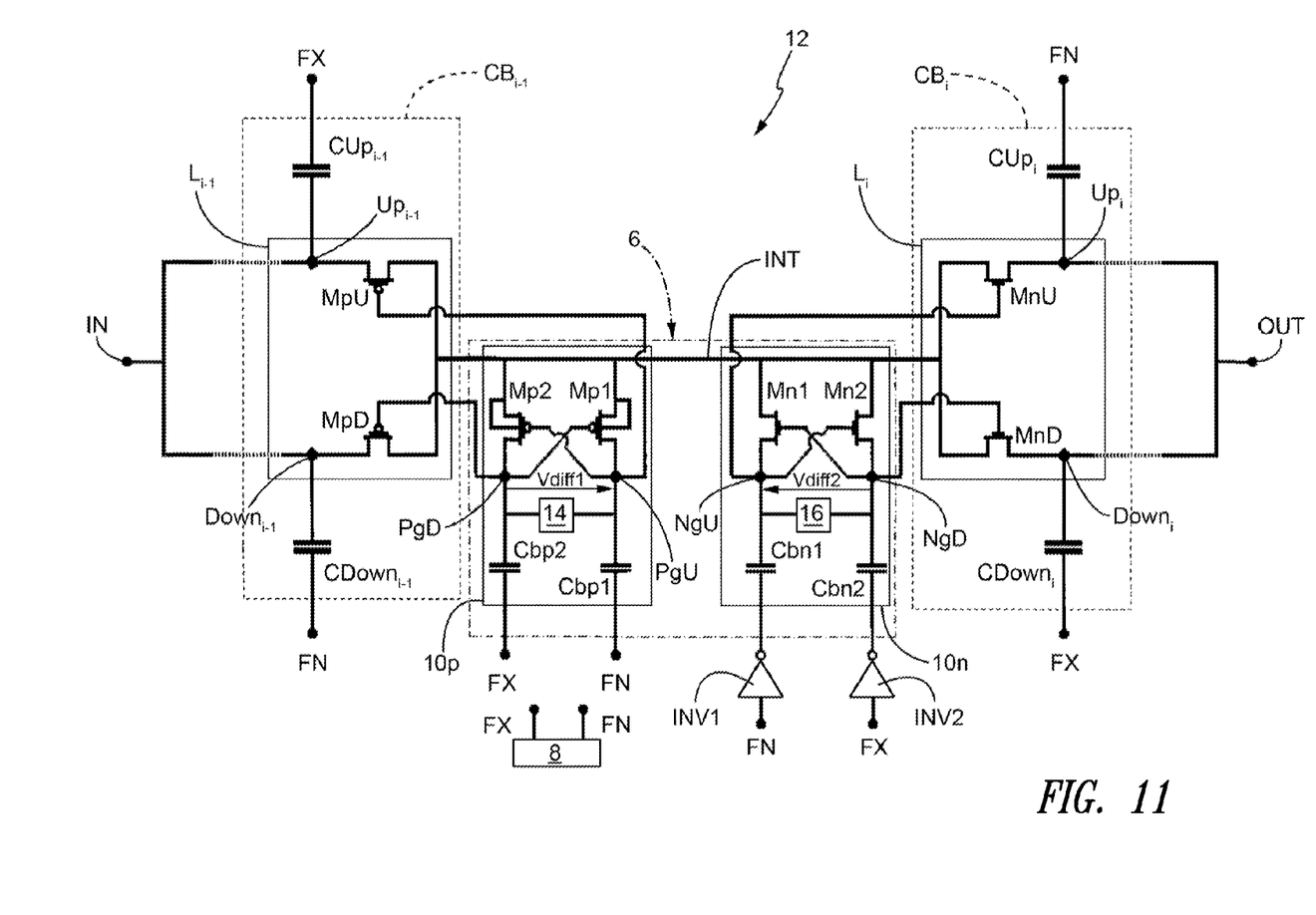
FIG. 11 shows a portion of another embodiment of a latch charge pump formed in accordance with the present disclosure.

As illustrated in FIG. 11, the charge pump 12 can moreover include the first and second logic inverters INV1 and INV2 already described. In this case, the third biasing capacitor Cbn1 is connected, instead of to the first enable terminal FX, to the first logic inverter INV1, which is in turn connected to the second enable terminal FN. In addition, the fourth biasing capacitor Cbn2 is connected, instead of to the second enable terminal FN, to the second logic inverter INV2, which is in turn connected to the first enable terminal FX.

Figure 12:
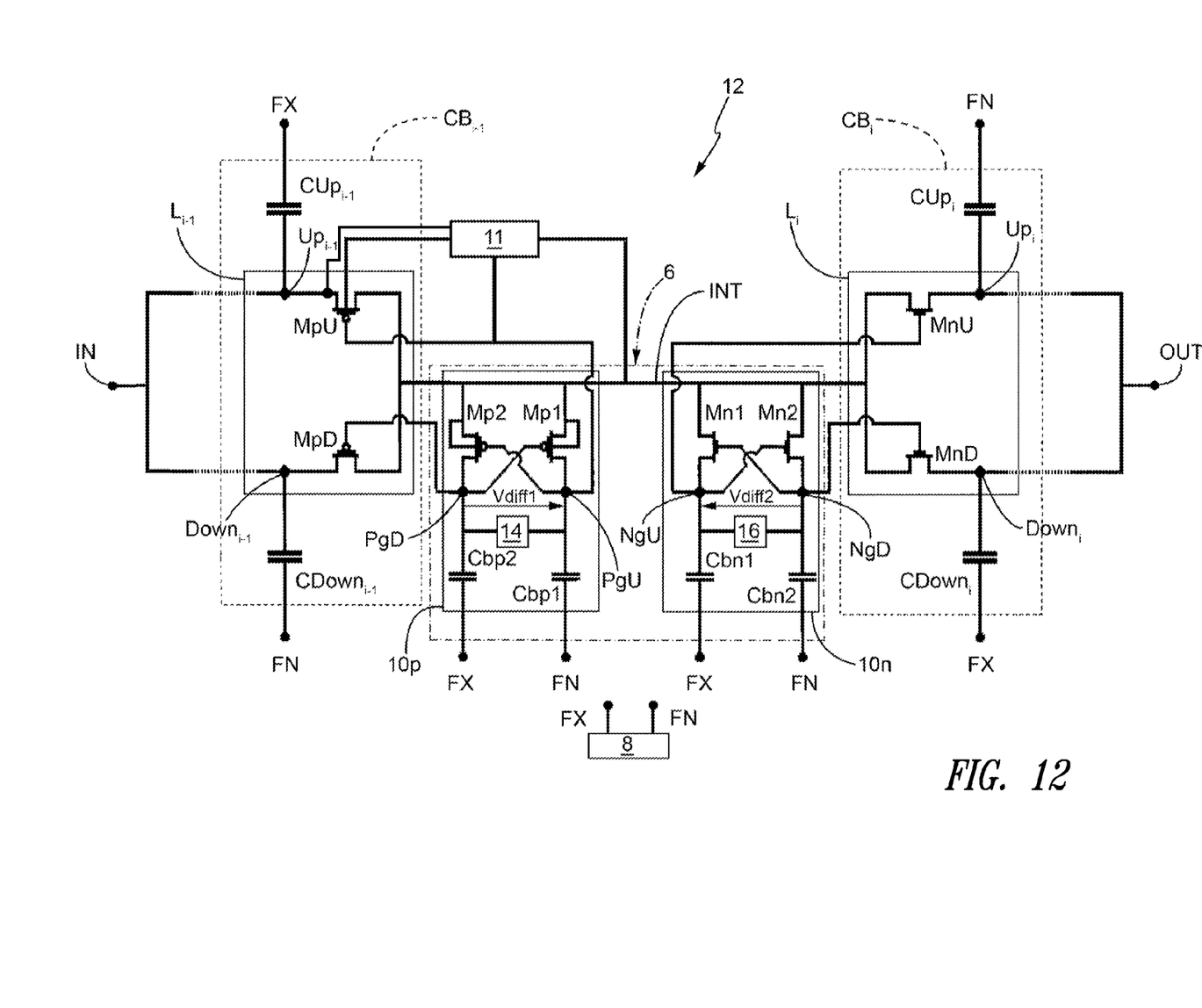
FIG. 12 shows a portion of a further embodiment of a latch charge pump formed in accordance with the present disclosure.

Finally, as shown in FIG. 12, a further embodiment of the charge pump 12 can envisage the presence of the bulk-biasing circuits 11 in order to prevent onset of the phenomenon of "latchup" within the P-channel MOS transistors forming part of the latch circuits of the charge pump 12 itself.

The advantages that the charge pump 12 described makes available emerge clearly from the foregoing discussion. In particular, the charge pump 12 is substantially immune from any malfunctioning following upon turning-off and turning back on of the charge pump 12 itself. In addition, the first and second equalization circuits 14, 16 do not interfere with normal operation of the charge pump 12 and can be made with reduced dimensions by being integrated with the remaining components of the charge pump 12.

Finally, it is evident that modifications and variations may be made to the charge pump 12 described and illustrated herein, without thereby departing from the sphere of protection of the present disclosure, as defined in the annexed claims.

For example, the first latch circuit $L_{i-1}$ and/or the second latch circuit $L_i$ can be made in a way different from the one described and shown, and in particular can include further MOS transistors.

In addition, the first equalization circuit 14 can be formed by N-channel MOS transistors, instead of by P-channel MOS transistors. Likewise, the second equalization circuit 16 can be formed by P-channel MOS transistors, instead of by N-channel MOS transistors.

Furthermore, the number $N_{t1}$ can be different from the number $N_{t2}$, and moreover the first equalization circuit 14 and/or the second equalization circuit 16 can be actually formed, instead of by diode-connected transistors, by diodes.

Finally, just one between the first equalization circuit 14 and the second equalization circuit 16 may be present.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:
    a charge pump having an input terminal, an output terminal, a first enable terminal, and a second enable terminal, the charge pump further including:
        at least a first charge-pump stage and a second charge-pump stage electrically coupled together at an intermediate node, the first charge-pump stage coupled to the input terminal and the first and second enable terminals, the second charge-pump stage coupled to the output terminal and the first and second enable terminals, the first charge-pump stage having:
            a first pump capacitor electrically coupled between the first enable terminal and a first internal node;
            a second pump capacitor electrically coupled between the second enable terminal and a second internal node;
            a first pump transistor electrically coupled between the first internal node and the intermediate node, and having a first control terminal; and
            a second pump transistor electrically coupled between the second internal node and the intermediate node, and having a second control terminal;
        the second charge-pump stage having:
            a third pump capacitor electrically coupled between the second enable terminal and a third internal node;
            a fourth pump capacitor electrically coupled between the first enable terminal and a fourth internal node;
            a third pump transistor electrically coupled between the first internal node and the intermediate node and having a third control terminal; and
            a fourth pump transistor electrically coupled between the second internal node and the intermediate node and having a fourth control terminal;
    a first stabilizing stage electrically coupled to the first charge-pump stage and including:
        a first biasing capacitor electrically coupled between the first control terminal of the first pump transistor and the second enable terminal;
        a second biasing capacitor electrically coupled between the second control terminal of the second pump transistor and the first enable terminal; and
        a first equalization circuit electrically coupled between the first and the second control terminals of the first and second pump transistors, respectively, and configured to limit a first voltage between the first and the second control terminals within a first range of values, the first equalization circuit including a first series circuit and a second series circuit, the first series circuit including a first number $N_{t1}$ of first voltage-controlled switches coupled in series to one another, the second series circuit including a second number of second voltage-controlled switches coupled in series to one another, the first series circuit and the second series circuit being coupled in parallel with reverse polarities.

2. The circuit according to claim 1, wherein the second number of second voltage-controlled switches is equal to the first number $N_{t1}$.

3. The circuit according to claim 1, further comprising a signal generator configured to supply to the first and second enable terminals a reference voltage $V_{dd}$, and wherein the first and second voltage-controlled switches are configured to have one and the same first threshold voltage $V_{th1}$, and the first number $N_{t1}$ is such that $V_{dd}-|V_{th1}|<N_{t1}*|V_{th1}|<V_{dd}$.

4. The circuit according to claim 1, wherein the first and second voltage-controlled switches each comprise a diode-connected transistor.

5. The circuit according to claim 4, wherein the first and second voltage-controlled switches are transistors of the same type as the first and the second pump transistor.

6. The circuit according to claim 1, further comprising:
    a third biasing capacitor electrically coupled between the third control terminal of the third pump transistor and the first enable terminal;
    a fourth biasing capacitor electrically coupled between the fourth control terminal of the fourth pump transistor and the second enable terminal; and
    a second equalization circuit electrically coupled between the third control terminal and the fourth control terminal and configured to limit a second voltage between the third and the fourth control terminals within a second range of values.

7. The circuit according to claim 6, wherein the second equalization circuit includes a third series circuit and a fourth series circuit, the third series circuit including a third number $N_{t2}$ of third voltage-controlled switches connected in series, the fourth series circuit including a fourth number of fourth voltage-controlled switches equal to the third number $N_{t2}$, the fourth voltage-controlled switches electrically coupled in series, and the third series circuit and the fourth series circuit are connected in parallel with reverse polarities.

8. The circuit according to claim 7, wherein the third and fourth number of voltage-controlled switches have one and the same second threshold voltage $V_{th2}$, the third number $N_{t2}$ being such that $V_{dd}-|V_{th2}|<N_{t2}*|V_{th2}|<V_{dd}$.

9. The circuit according to claim 8, wherein the third and fourth voltage-controlled switches each comprise a diode-connected transistor.

10. The circuit according to claim 9, wherein the third and fourth voltage-controlled switches are transistors of the same type as the third and the fourth pump transistor.

11. The circuit according to claim 10, wherein the first number $N_{t1}$ and the third number $N_{t2}$ are equal.

12. The circuit according to claim 1, further comprising:
    a first control transistor having conduction terminals connected, respectively, to the first control terminal and to the intermediate node, and a gate terminal connected to the second control terminal; and a second control transistor having conduction terminals connected, respectively, to the second control terminal and to the intermediate node, and a gate terminal connected to the first control terminal.

13. The circuit according to claim 12, further comprising:

a third control transistor having conduction terminals connected, respectively, to the third control terminal and to the intermediate node, and a gate terminal connected to the fourth control terminal; and a fourth control transistor having conduction terminals connected, respectively, to the fourth control terminal and to the intermediate node, and a gate terminal connected to the third control terminal.

14. The charge pump according to claim 13, wherein the first and second pump transistor are P-channel MOS transistors; and wherein the third and fourth pump transistor are N-channel MOS transistors.

15. A system, comprising:

a charge pump having:

at least first and second charge-pump stages coupled at an intermediate node, each charge-pump stage and having a first and second pump transistors with first and second control terminals respectively;

a first equalization circuit coupled between the first and second control terminals of the first charge-pump stage and configured to limit a voltage between the first and second control terminals in the first charge-pump stage, the first equalization circuit including:

a first series circuit having a first number $N_{r1}$ of first voltage-controlled switches connected in series with one another;

a second series circuit having a second number of second voltage-controlled switches connected in series with one another; and the first and second series circuits being connected in parallel with reverse polarities; and a second equalization circuit coupled between the first and second control terminals of the second charge-pump stage and configured to limit a voltage between the first and second control terminals in the second charge-pump stage.

16. The circuit of claim 15, wherein the first equalization circuit is structured to limit the voltage between the first and second control terminals of the first charge-pump stage within a first range of values, and the second equalization circuit is structured to limit the voltage between the first and second voltage terminals of the second charge-pump stage to a second range of values.

17. The circuit of claim 16, wherein the second number of second voltage-controlled switches is equal to the first number $N_{r1}$.

18. The circuit of claim 15, wherein the second equalization circuit comprises a third series circuit and a fourth series circuit, the third series circuit including a third number $N_{r2}$ of third voltage-controlled switches electrically coupled connected in series, the fourth series circuit including a fourth number of fourth voltage-controlled switches equal to the third number $N_{r2}$, the fourth voltage-controlled switches being electrically coupled in series; and wherein the third and fourth series circuit are electrically coupled in parallel with reverse polarities.

* * * * *